United States Patent [19]

Laurent et al.

[11] Patent Number: 5,261,795
[45] Date of Patent: Nov. 16, 1993

[54] VOLUMETRIC PUMP AND PROCESS FOR VOLUMETRIC PUMPING

[75] Inventors: Daniel Laurent, Meylan; Michel Deal, St-Remy-en-Rollat; Francis Brihaye, Pontgibaud, all of France

[73] Assignee: Sedepro, Paris, France

[21] Appl. No.: 974,687

[22] Filed: Nov. 12, 1992

Related U.S. Application Data

[63] Continuation of Ser. No. 908,488, Jun. 30, 1982, abandoned, which is a continuation of Ser. No. 529,182, May 25, 1990, abandoned.

[30] Foreign Application Priority Data

Jun. 1, 1989 [FR] France .............................. 89 07494

[51] Int. Cl.$^5$ ...................... F04B 23/10; B29C 47/38
[52] U.S. Cl. ................... 417/205; 417/501; 417/539; 264/297.2; 264/539
[58] Field of Search ............... 417/205, 490, 501, 540, 417/539; 264/297.2, 539; 425/155, 166, 163

[56] References Cited

U.S. PATENT DOCUMENTS

| | | | |
|---|---|---|---|
| 2,041,422 | 5/1936 | L'Orange | 417/501 |
| 2,484,005 | 10/1949 | Alberti | 425/155 |
| 2,779,298 | 1/1957 | Chwirut | 425/163 |
| 2,811,931 | 11/1957 | Everett | 417/265 |
| 2,944,288 | 7/1960 | Sherman | 214/37 |
| 3,012,286 | 12/1961 | Gasmire | 264/539 |
| 3,029,471 | 4/1962 | Adams et al. | 264/297.2 |
| 3,032,819 | 5/1962 | Gasmire | 425/163 |
| 3,090,994 | 5/1963 | Stenger | 264/539 |
| 3,093,861 | 6/1963 | Rex | 264/539 |
| 3,374,304 | 3/1968 | Ayres | 264/297.2 |
| 3,477,097 | 11/1969 | Plymale | 264/539 |
| 3,530,536 | 9/1970 | Thorman | 425/163 |
| 3,605,647 | 9/1971 | Beck | 425/155 |
| 3,706,827 | 12/1972 | Nott et al. | 264/176.1 |
| 3,834,838 | 9/1974 | Indra | 417/490 |
| 3,861,841 | 1/1975 | Hanning | 425/166 |
| 4,245,963 | 1/1981 | Hutchins | 417/540 |
| 4,417,857 | 11/1983 | Sudbeck | 417/501 |
| 4,507,255 | 3/1985 | Shizawa | 425/166 |
| 4,963,207 | 10/1990 | Laurent | 156/117 |

FOREIGN PATENT DOCUMENTS

| | | |
|---|---|---|
| 151530 | 7/1952 | Australia . |
| 402882 | 5/1966 | Australia . |
| 404597 | 9/1966 | Australia . |
| 10834 | 1/1970 | Australia . |
| 0158814 | 10/1985 | European Pat. Off. . |
| 1778125 | 7/1971 | Fed. Rep. of Germany . |
| 2201404 | 7/1973 | Fed. Rep. of Germany . |
| 2814285 | 10/1979 | Fed. Rep. of Germany . |
| 2301377 | 9/1976 | France . |
| 1339308 | 7/1978 | France . |

Primary Examiner—Richard A. Bertsch
Assistant Examiner—Peter Korytnyk
Attorney, Agent, or Firm—Brumbaugh, Graves, Donohue & Raymond

[57] ABSTRACT

A volumetric pump for paste-like material, for example, unvulcanized rubber, in which a screw 21 feeds a cylinder 11 through ports 12 and in which a delivery piston 10 within the cylinder displaces the material through a non-return valve 15. A process for volumetric pumping of the material utilizing such volumetric pump.

16 Claims, 6 Drawing Sheets

VOLUMETRIC PUMP AND PROCESS FOR VOLUMETRIC PUMPING

This application is a continuation of application Ser. No. 07/908,488, filed on Jun. 30, 1992, now abandoned, which in turn was a continuation of application Ser. No. 07/529,182, filed May 25, 1990, now abandoned.

BACKGROUND OF THE INVENTION

The present invention relates to volumetric pumping which can be used for paste-like materials, in particular unvulcanized rubber.

The methods of processing rubber products require, in various stages of their manufacture, a quantitative dosing of the unvulcanized rubber.

For example, at the time of the production of the mixes one generally proceeds by weighings. For the application of the rubber product onto a tire blank, Patent Application EP 0 264 600 proposes the use of a cylinder piston unit in order to permit volumetric dosing due to the precisely determined character of the volume swept over by the piston acting as an extrusion member. Unfortunately, the process is an intermittent one since, when the cylinder is empty, it is necessary to refill it before being able to effect a new dosing.

The use of screw extruders makes it possible to make passage from the raw material to the extruded products continuous. However, screw extruders are not volumetric, particularly during their starting and stopping phases. Screw extruders can extrude a determinable volume only in the case of perfectly established conditions: stabilized temperature and no variations in losses of head at the outlet from the extruder. Furthermore, in the case of screw extruders, when changing from one mix to another having different physical properties, for instance a different binder, the extruded output for a given speed of rotation of the screw will be different. One necessary condition in order for an extruder or a pump to be able to be considered volumetric is that the extruded output depend only on a control parameter of said extruder or pump (for instance, the speed of rotation of an input shaft) and does not depend significantly on the physical properties of the material to be extruded.

SUMMARY OF THE INVENTION

The object of the present invention is to provide a method and a volumetric pump which can operate continuously, while remaining volumetric during the starting and stopping phases regardless of the extruded output, and which can be used even with materials which are difficult to handle, for example, pasty, visco-elastic or plastic materials, such as unvulcanized rubber.

The invention proposes a method of volumetric pumping by means of at least one delivery piston which slides within a cylinder between a top dead center and a bottom dead center, the wall of the cylinder having admission ports located axially between said top and bottom dead centers, the wall which blocks off the said cylinder on the upper end centerline, having a discharge opening provided with a nonreturn device, the pumping cycle comprising feeding said cylinder with the material to be pumped while the piston does not cover the admission ports, advancing the piston thus closing of the admission ports, opening the non-return device in order to release the discharge opening as soon as the piston has completely closed the admission ports, continuing the advance of the piston up to the top dead center and then again closing the discharge opening by the non-return device and returning the piston towards the bottom dead center and then repeating this cycle.

A variant of this method provides for the use of at least two pistons the movements of which are so controlled that the sum of the outputs passing through the said discharge openings is constant.

In accordance with the invention, the volumetric pump comprises at least one delivery piston sliding in a cylinder in accordance with a reciprocating movement between a top dead center and a bottom dead center. The wall of the cylinder has admission ports located axially between said top dead center and bottom dead center, and the wall closing off the cylinder on the top dead center side has a discharge opening provided with a non-return device. Said pump has means for feeding the cylinder through the admission ports. The volume extruded in one cycle of the pump is a function of the volume swept over by each delivery piston between the point where it closes the said port or ports and the top dead center.

In accordance with conventional terminology, the "top dead center" is the point of the stroke reached at the end of compression and the "bottom dead center" is the opposite end of the stroke of the piston.

Such a pump delivers upon each cycle a volume of material which is independent of the delivery pressure; it is therefore volumetric. However, in its simplest variant, such a pump has a single piston and its output is pulsating; it may be constant on the average, but it cannot be identical at all times of the cycle.

For this reason, the invention further provides adding to this volumetric pumping unit a discharge stabilization element, or else the invention provides for developing a multi-piston pump which is moved in such a manner that the instantaneous output can be identical to the average output.

DESCRIPTION OF THE DRAWINGS

The accompanying drawings show different variants of the invention in which the pump is, in each case, designed as an individual body, driven by a single input shaft, capable of being manipulated by a robot comprising a transmission which can be engaged to the input shaft. This arrangement, to be sure, is not limitative.

DESCRIPTION OF THE PREFERRED EMBODIMENTS

Figure 1:
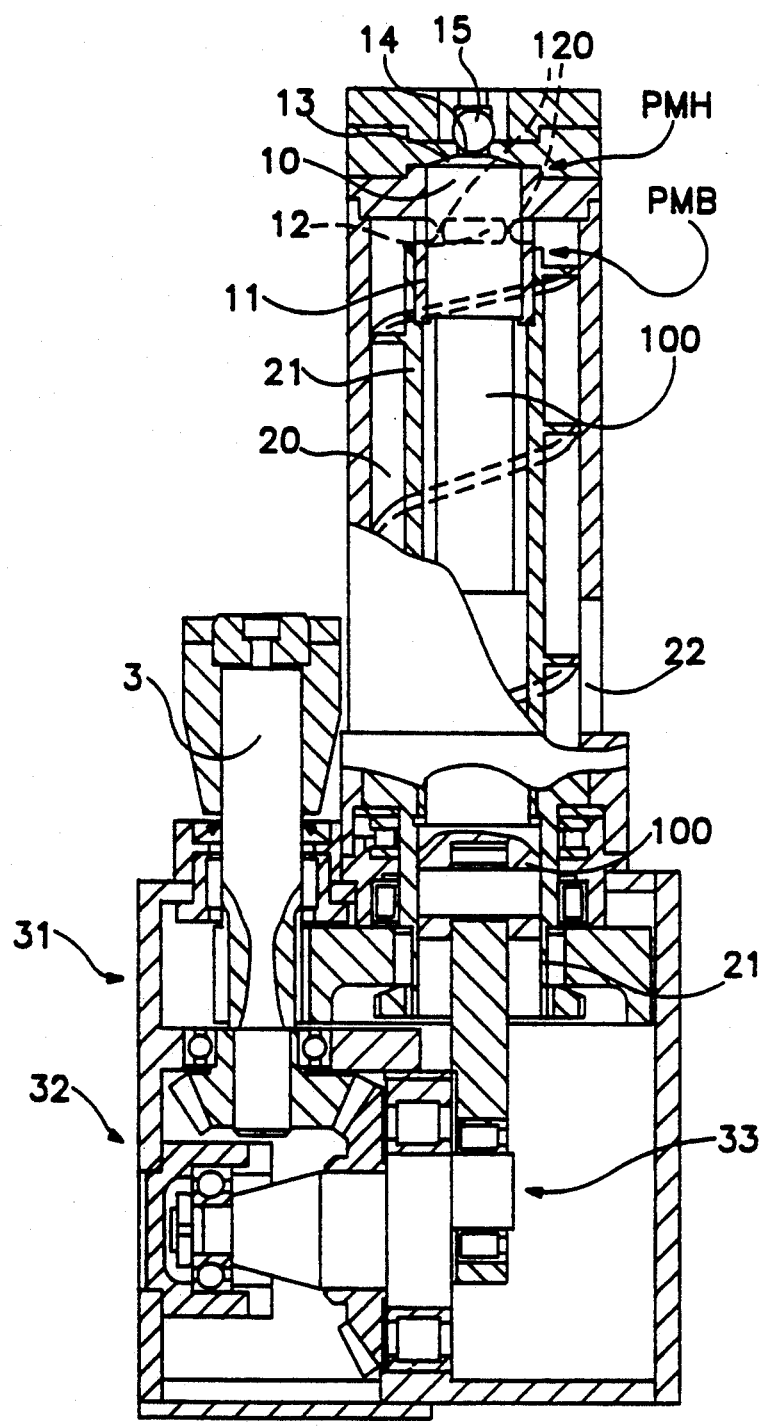
FIG. 1 shows a section of a volumetric pump embodying the invention.
Figure 2:
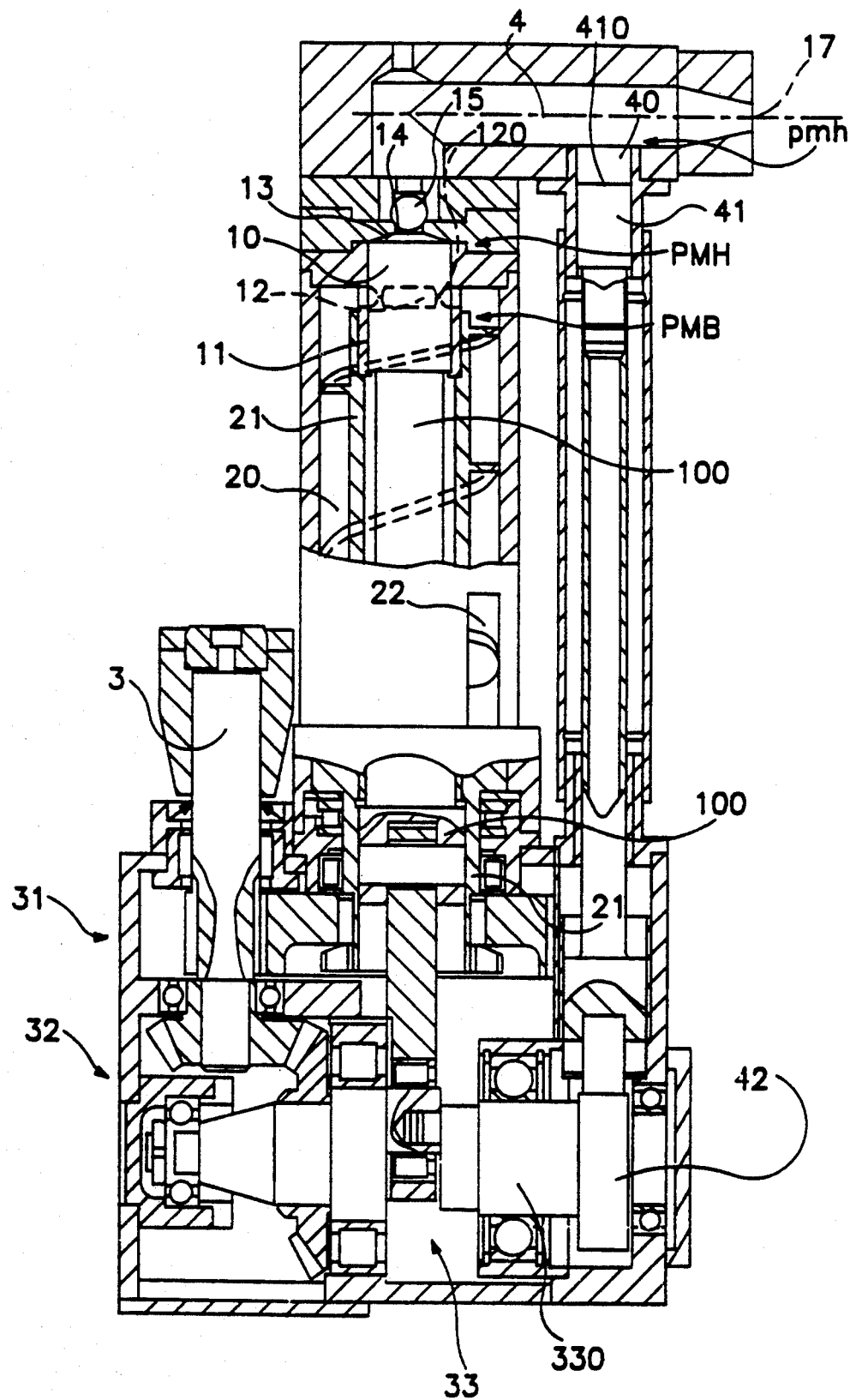
FIG. 2 shows a section of the same pump embodying a pulsation compensation device.

FIGS. 1 and 2 show a delivery piston 10 sliding in a cylinder. The delivery piston 10 is shown at the top dead center (PMH) of its stroke. In this position, the four ports 12 provided in the wall of the cylinder 11 are closed by the delivery piston 10, while they are no longer closed at the bottom dead center (PMB) of the stroke. A chamber 20 partially enclosing the cylinder 11 is also shown in FIGS. 1 and 2. A feed screw 21, the axis of rotation of which is identical to the axis of the cylinder, 11, is in rotation in this chamber 20 and assures a positive transfer by mechanical displacement of the material towards the ports 12 which, in turn, are arranged at the end of said chamber 20.

Due to the filling through ports 12 arranged in the side wall of the cylinder 11, any material, and, in particular, unvulcanized rubber, can be transferred very efficiently into the cylinder since this arrangement permits a very large passage section and a minimum of losses in head. The continuity of the wall of the cylinder 11 is maintained over several narrow sectors 120 in order to assure the guidance of the delivery piston 10 in the cylinder 11. The dimension of the ports 12 in the axial direction (direction of movement of the delivery piston 10) is optimized to assure the volumetric character of the pump by a complete feeding of the cylinder 11 (ports as large as possible in the axial direction), and in order to obtain a maximum discharge at a given speed (ports as small as possible in the axial direction). Since the chamber 20 surrounds the cylinder 11 on all sides, the filling of the piston swept part of the cylinder is effected over its entire periphery and is therefore very rapid.

At the other end of the chamber 20 there is a feed trap 22 which can be noted in the radially outer wall of this chamber 20. It is sufficient to introduce an unvulcanized strip of rubber into the feed trap 22, since the rotation of the feed screw 21 automatically results in the necessary feeding of rubber. One could easily contemplate other forms of feeding raw rubber, no volumetric precision being required at this place. By the concentric arrangement of the feed screw 21 with respect to the cylinder 11, a good final distribution of the material throughout the cylinder 11 and reduced size are assured.

The wall 13 which closes the cylinder 11 on the top dead center side (PMH) has an evacuation opening 14 provided with a non-return device. In this case, this is a ball 15, the rearward movement of which is limited by a stop. This ball 15 releases the opening 14 under the effect of the pressure imparted to the rubber by the delivery piston 10 and closes the opening 14 under the effect of a back pressure. Such a pump makes it possible to effect a perfectly volumetric dosaging of a paste product, such as rubber in unvulcanized condition.

It is possible to cause a return of the ball 15 onto its seat by means of a spring in order to close the opening 14 independent of the back pressure conditions prevailing downstream of the opening 14. It is also possible to provide a non-return device, such as a flap controlled synchronously with the movements of the delivery piston 10 in order to cause a rapid lifting as soon as the ports 12 are covered by the delivery piston 10 and to close the opening 14 as soon as the piston has reached its top dead center.

The kinematic chain comprises the input shaft 3, a first gear train 31 controlling the rotation of the screw 21 and a second gear train 32 which, via a connecting rod/crank system 33, controls the reciprocating movement of the rod 100 forming an extension of the delivery piston 10.

The output of the pump described up to now is pulsating; this means that for a given speed of rotation imparted to the input shaft 3, the average output is constant while the instantaneous output of the delivery piston 10 within a cycle is variable. For applications in which pulsation is to be avoided, it is advisable to add downstream of the non-return device and upstream of the outlet orifice, an enclosure of variable volume which is capable of compensating for the pulsation. The variation in the volume of the enclosure must make it possible to absorb a part of the volume extruded by the delivery pump during the useful part of its stroke and to maintain a discharge through the outlet orifice for the rest of the cycle of the pump, restoring the volume absorbed while the non-return device closes off the discharge opening of the cylinder.

This is the role of the pulsation compensation device described in connection with FIG. 2. An enclosure 4 of variable volume is arranged between the evacuation opening 14 and the outlet orifice 17. The volume which it is necessary to absorb during the stroke of the piston 10 between the point where it closes the ports 12 and the top dead center must correspond to the volume swept by a compensation piston 41. The head 410 of the compensation piston 41 constitutes a part of the wall of the enclosure 4.

In FIG. 2, 40 is the variable portion of the volume of the enclosure 4, that is to say, the volume contained between the head 410 of the compensation piston 41 at the point in question of its cycle and the head 410 of the compensation piston 41 when it is at its top dead center. The movement of the compensation piston 41 is coordinated with that of the delivery piston 10 so as to make the discharge passing through the outlet orifice 17 constant.

The movements are all controlled from the same input shaft 3. It can be seen that the crankshaft 330 of the connecting rod/crank system 33 driving the delivery piston 10 also assures the synchronous rotation of a cam 42 which controls the advance of the compensation piston 41, the return of the said compensation piston 41 being assured by the back pressure prevailing in the chamber 4.

Figure 3:
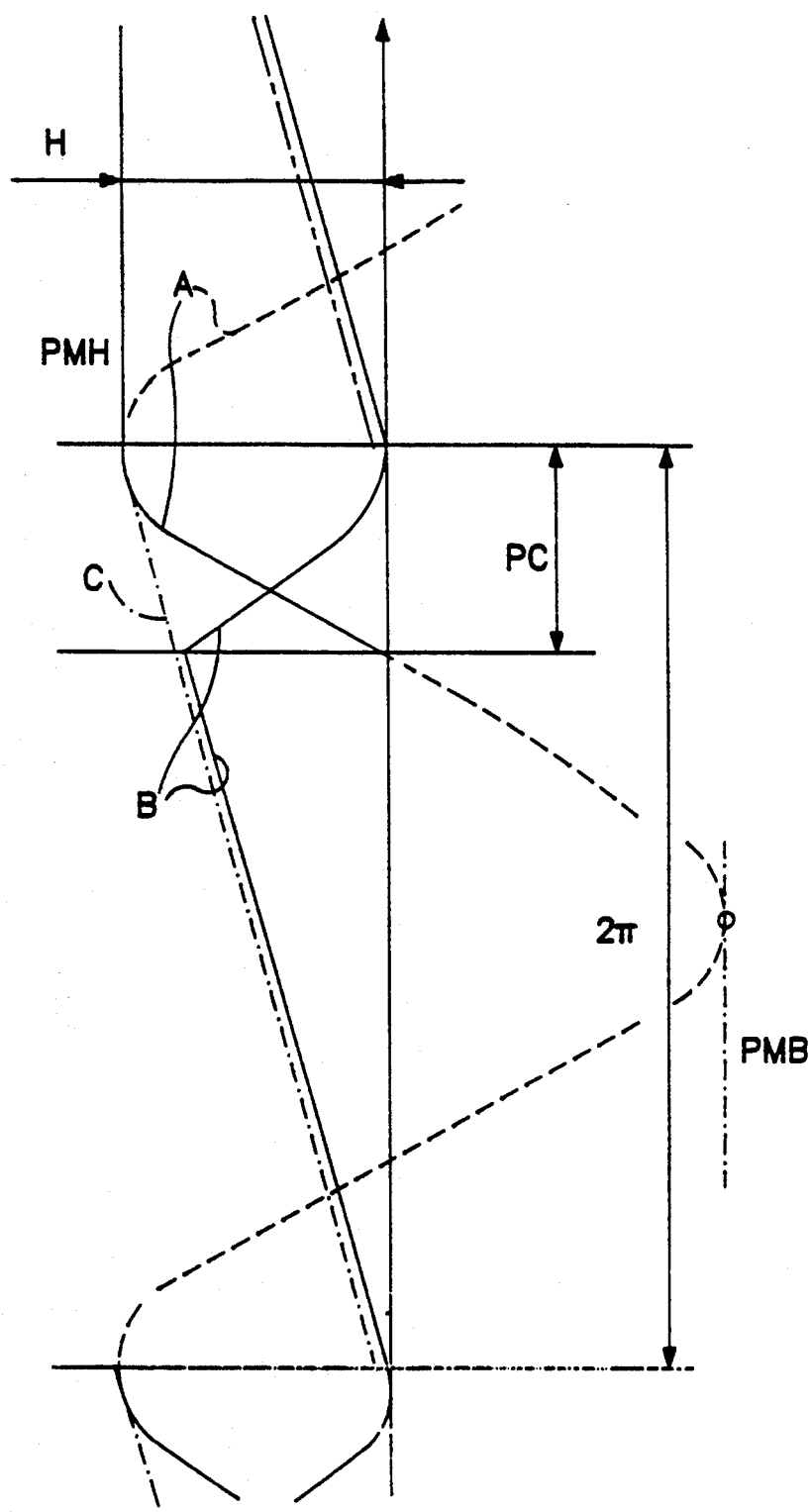
FIG. 3 is a chart which illustrates certain of the movements of the pump shown in FIG. 2.

In FIG. 3 the main movements of the pump are shown in developed view. The abscissas represent the angle of rotation of the crankshaft 330. The ordinates represent the stroke of the delivery piston 10, visualized by the curve A, and the stroke of the compensation piston 41, visualized by the curve B.

The profile of the cam is determined in such a manner that at every instant the volumes generated by the displacement of the delivery piston 10 and of the compensation piston 41, which volumes are algebraically totalled, assure a constant discharge through the outlet orifice 17. In said totalization, the action of the delivery piston 10 is included (solid line portion of the curve A) only during its useful displacement PC between the closing of the ports 12 and the top dead center (portion H of the stroke, referred to as the useful stroke) and is to be considered zero during the rest of the cycle. Said constant discharge is itself determined very simply by spreading the volume of material capable of being extruded by the delivery piston 10 over the entire cycle in such a manner that it operates without taking into account the compensation piston 41. During a compensation phase PC, the sum of discharges due to the delivery piston 10 (curve A) and the compensation piston 41 (curve B) is represented by the curve C.

When the movement of the delivery piston 10 is controlled by a connecting rod/crank system, the linear speed of the piston is close to its maximum at the moment when the delivery piston 10 closes the ports 12, at which moment the opening 14 is released. The compensation thus imposes a sudden reversal of the movement of the compensation piston 41, with a maximum speed of return which is precisely correct after this reversal of movement (phase PC in FIG. 3).

The pump designed in this manner can be very compact; it lends itself very well to the robotized dosaging of the rubber products onto a tire blank, the expression "blank" designating the tire during the course of manufacture at any stage prior to its vulcanization. The invention also makes it possible to use a method of manufacturing tires in which the unvulcanized rubber is placed on the blank by a pumping process such as described above.

In order to avoid having to effect a sudden compensation, the movement of the delivery piston as well as that of the compensation piston can just as well be controlled by cams, the profiles of which are properly designed. When the rheology of the mixture permits, one can also feed several pistons with a single feed screw 21. This makes it possible to increase the discharge of which the pump is capable, all other things being equal, and this minimizes the interruption of the flow of rubber in the chamber 20, which interruption could lead to a high heating of the rubber if the feed screw still continues to rotate.

Therefore, when the application contemplated does not make it possible to adapt a drive by a connecting-rod/crankshaft system, there is proposed a volumetric pump having an admission trap for the material and an outlet orifice which is actuated completely by a single input shaft comprising at least one delivery piston sliding in a cylinder with reciprocating movement between a top dead center and a bottom dead center, the wall of the cylinder having an admission opening for the material which can be closed during the delivery and an evacuation opening provided with a non-return device, said pump having means for feeding the said cylinder through the admission opening, the volume extruded by the pump in a cycle being a function of the volume swept over by each delivery piston between the moment of its stroke at which the admission opening is closed and the top dead center of its stroke, the movement of each piston being controlled by a cam system, the path or paths of which are designed in such a manner that the discharge of material passing through the outlet orifice is constant for a constant speed of the input shaft.

Figure 4:
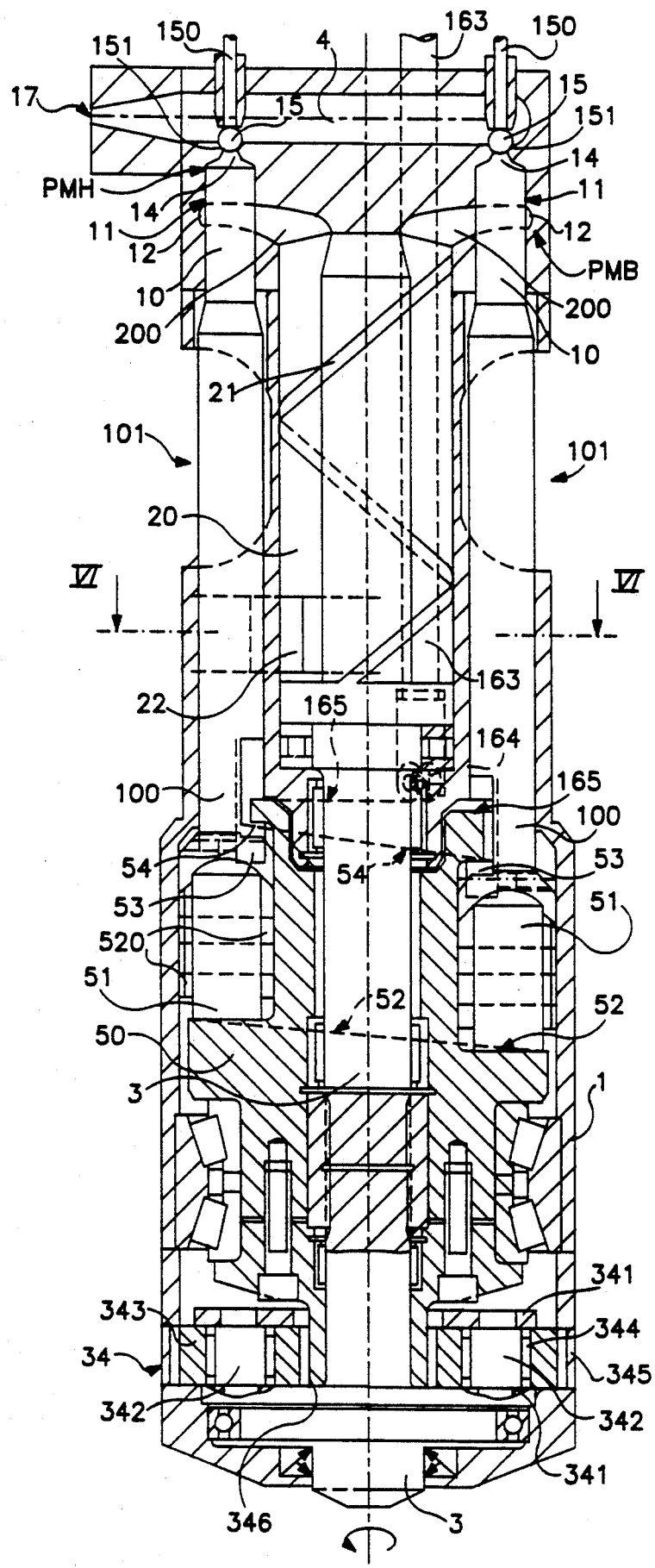
FIG. 4 is a section of a multi-piston volumetric pump, as seen in section along the line IV—IV of FIG. 6.

FIG. 4 shows a variant embodiment of the pump having two delivery pistons 10, the movements of which are controlled by one single cam 50. In the present description, the expression "cam" refers generically to any mechanical element which makes it possible to produce a linear periodic or angular periodic movement with the aid of a circular movement in accordance with a selected law.

The input shaft 3 is in direct contact with a feed screw 21 arranged within a chamber 20 provided with a feed trap 22. The feed screw 21 assures transfer of the material towards the end 200 of the chamber 20 from where it passes into the cylinders 11 via the ports 12. These ports 12 are arranged on the entire periphery of the cylinder 11 in order to promote good filling.

The filling of each cylinder 11 is effected with the piston 10 retracted, as explained above. The precise volume to be extruded is determined by the swept volume of the cylinder 11 at the precise moment when the piston 10 closes the filling port 12. On the top dead center side, a non-return device, consisting here of a ball 15 the movements of which will be explained below, has been arranged on the opening 14 of the cylinder 11.

The movement of the two delivery pistons 10 is coordinated in such a manner as to make constant the discharge which passes through the outlet office 17 located downstream of the enclosure 4 which receives the material delivered by each cylinder 11.

The movement of all the pistons is controlled by a cam 50. This cam 50 is of the double-acting cylindrical type. The cam 50 is driven in rotation at a speed four times greater than the speed of rotation of the input shaft 3 by an epicyloidal train 34. The input shaft 3 is rigidly connected to the satellite carrier 341 on which two crank pins 342 are present. The satellites 343 are mounted on the said crankpins 342 on needle bearings 344. The teeth of the satellites 343 are in engagement with the outer ring 345 and with the inner ring 346. The inner ring 346 is fastened to the cam 50. The cam 50 rests via anti-friction bearings around the shaft 3 and within the body 1 of the pump.

The movement in translation of the pistons 10 is parallel to the axis of rotation of the cam 50. The movement of each delivery piston 10 from the bottom dead center to the top dead center is controlled by a primary roller 51 in engagement with a first travel path 52 machined on the cam 50. This primary roller 51 is held by a fork between two side plates 520 arranged on opposite sides of the roller 51. Furthermore, this primary roller 51 is arranged in the axis of the piston 10 which it drives. The fork avoids the roller 51 being mounted overhung. In this way, the piston 10 and, in particular, the rod 100 which forms a rearward extension thereof and connects to the roller 51 are not acted on in flexure, which is very important in view of the high forces caused by the delivery pressure, which can be considerable.

The return movement from the top dead center to the bottom dead center takes place under little force. It is controlled by a secondary roller 53 which is much smaller than the primary. This roller 53 is mounted overhung on the rod 100 with respect to the piston 10 and is in engagement with a second travel path 54 of the cam 50.

Figure 7:
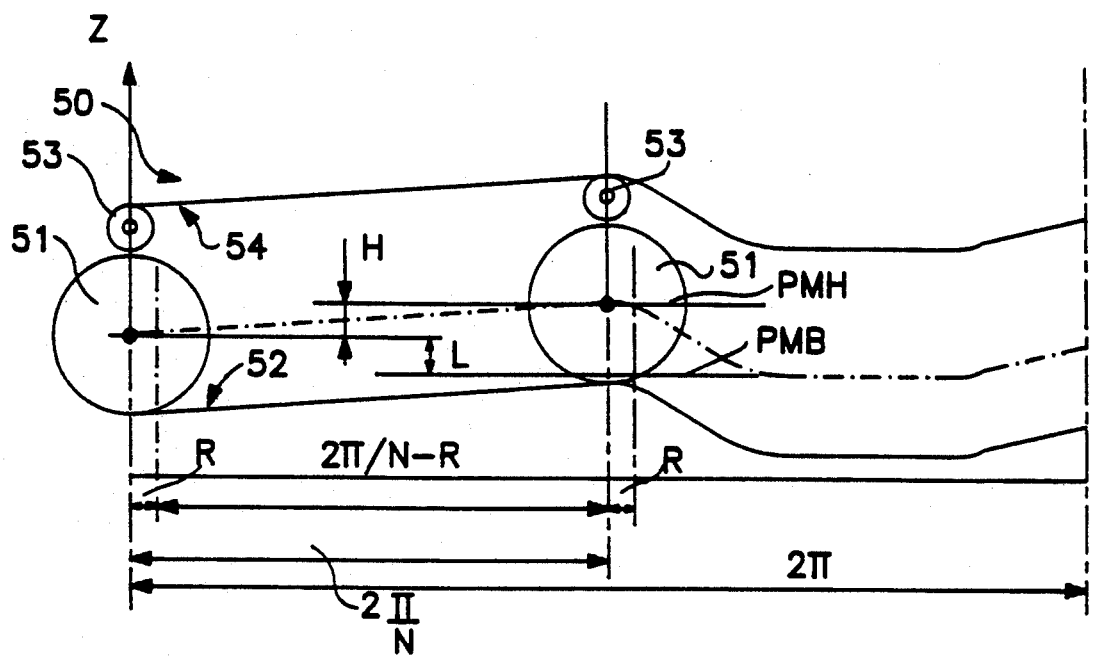
FIGS. 7 and 8 are schematics which explain the control of the essential movements of the pump shown in FIG. 4.
Figure 8:
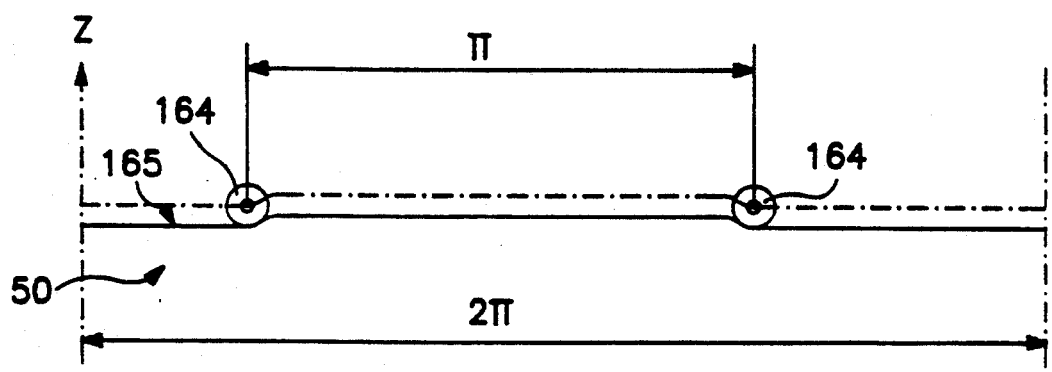

FIGS. 7 and 8 are developed views of the cam 50, making its principle of design clear. The abscissas represent angles. A complete revolution corresponds to a rotation of 2x radians. "N" is the number of delivery pistons 10. There are necessarily N rollers or roller assemblies 51 and 53, each assuring the drive of a delivery piston 10, all separated from each other by an arc of $2\pi N$ radians. On the ordinates there is plotted the displacement Z in the direction of the axis of each delivery piston 10. The height H represents the useful stroke of each piston, that is to say, the stroke between the closing of the port 12 and the top dead center PMH.

The travel path 52 has a constant slope over an arc of $(2\pi/N) - R$ in which R is an angle of overlap between two pistons corresponding to the time during which the delivery piston arriving at its dead center is slowed down and during which it is necessary to accelerate the following delivery piston in order to assure the constancy of the discharge. In addition to these periods of overlap, one of the delivery pistons 10 is imparted with a uniform movement of advance at a constant speed for an action with constant speed of rotation on the input shaft 3. Therefore the slope of the travel path 52 corresponding to $2\pi/N$ is constant.

On both sides, the travel path 52 is designed to permit, downstream of 2π/N, the stopping at the top dead permit, downstr center (the path 52 therefore is of zero slope at the end of the downstream period R) and upstream, the coordinated starting of the following delivery piston (the travel path 52 therefore has a shape such that the sum of the respective advances of each of the rollers 51 assures constancy of the discharge. The rest of the travel path 52 is such that each piston can pass from the top dead center PMH towards the bottom dead center PMB and then advance up to the closing of its port 12, with sufficiently progressive connections to assure a smooth movement.

The secondary roller 53 is in engagement with a path 54 shaped in such a manner as to assure a double-acting drive, namely each of the rollers 51 and 53 of each piston is in constant engagement with its travel path. It is also possible to notch the fork having the roller in order to permit it to enter into engagement by a side edge with a travel path assuring the return of the piston towards the bottom dead center, thus obtaining a twofold control with a single roller.

Each rod 100 passes into recesses 101 (FIG. 4) provided in the body 1 of the pump. The role of these recesses is to collect any slight leaks of rubber between pistons 10 and corresponding cylinders 11 in order to prevent the rubber from accumulating at an undesirable place, for instance at the level of the transmission. These leaks are, in any event, entirely negligible with respect to the volumetric aspect of the pump, the volumetric precision of which reaches 0.3%, but they must be taken into account with regard to the maintenance aspect of the pump, which must operate for several tens of thousands of hours without breakdown.

Figure 5:
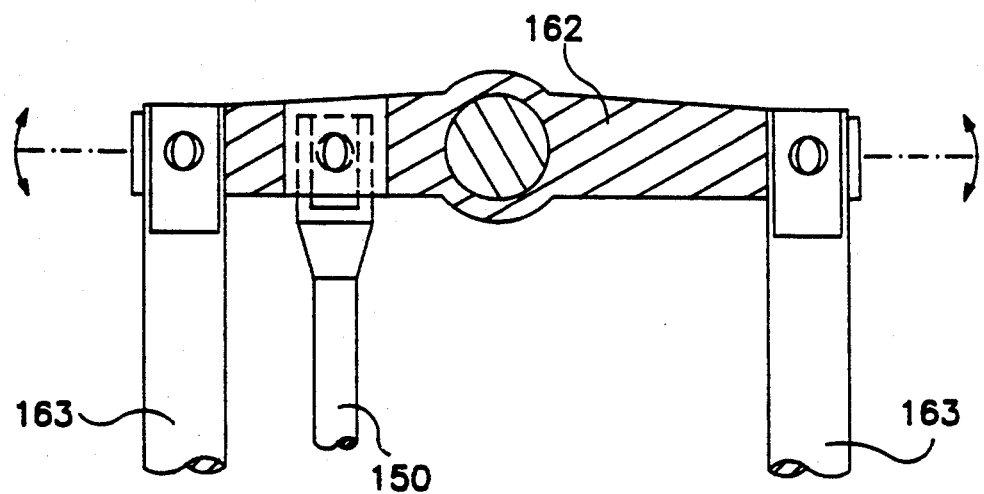
FIG. 5 is a view along the line V—V of FIG. 6.
Figure 6:
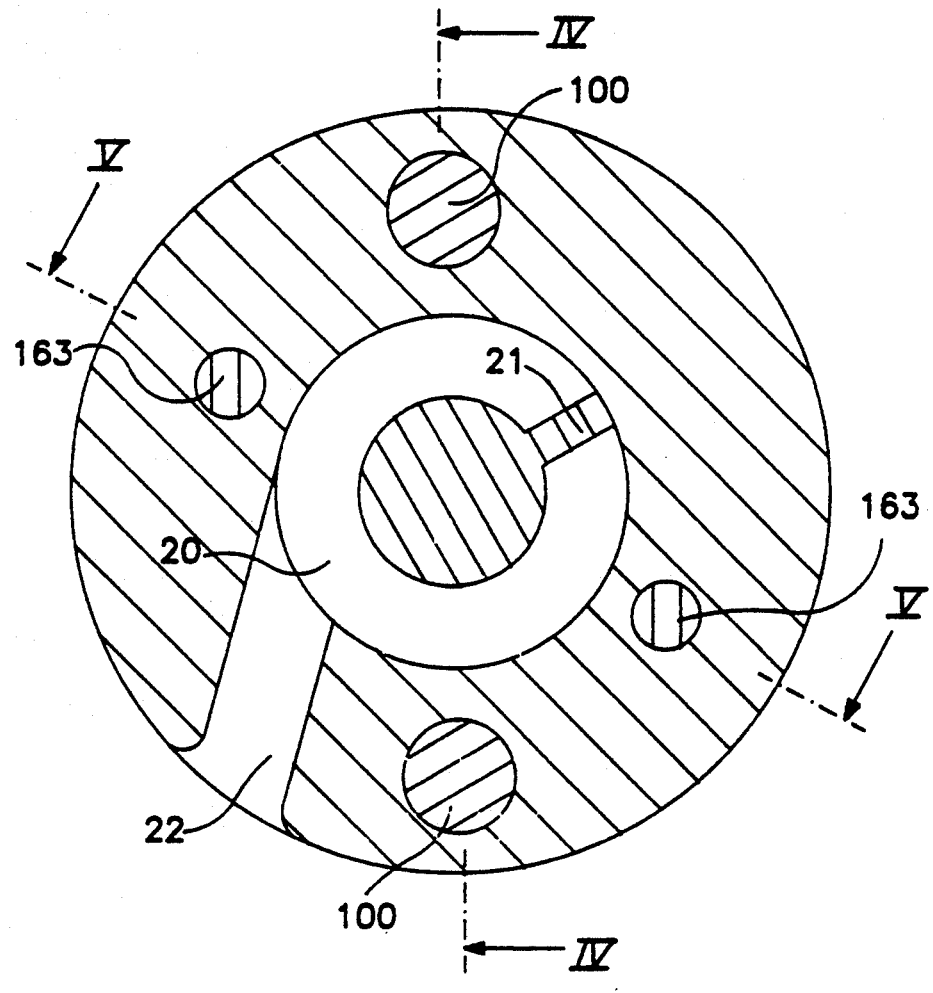
FIG. 6 is a partial view along the line VI—VI of FIG. 4.

The anti-return device to be placed downstream of the cylinders is formed here by a ball 15 which cooperates with a seat 151 made on the evacuation opening 14 of the outer side of the cylinder 11. Each ball 15 is in contact with an extender 150. The two extenders 150 are in contact with the same rocker 162 (see FIG. 5) which sees to it that one of the balls 15 is against its seat 151 when the other ball releases the opening 14, and vice versa. The rocker 162 is, in its turn, driven by two push rods 163, each acted on by a roller 164. The rollers 164 are spaced 180° apart and cooperate with a travel path 165 machined on the cam 50 to permit the movement of a ball 15 synchronously with respect to the movement of the corresponding delivery piston. The presence of two push rods 163 is necessary in order to assure double-acting control with a single travel path 165, as can be clearly noted from FIG. 4. FIG. 8 is in phase with FIG. 7, which is actually drawn for this special case in which N=2.

If necessary, it is possible to add to the pump of the invention an air, water or oil cooling device as a function of the heat liberated, with due consideration of the resultant deficiency of the work of the feed screw. This screw may also play a mixing role.

It is obvious that the description given is purely illustrative and does not limit the scope of the present invention, and that numerous variants can easily be contemplated by the person skilled in the art for all the nonessential features of the invention.

When applied to the manufacture of tires, a pump of this kind can be provided for each type of rubber mix which is to constitute the tire. Each pump is manipulated by a robot which assures the proper presentation of the outlet orifice 17 to the tire blank during the course of manufacture, while driving the input shaft 3 in rotation in accordance with the volume to be extruded. A single manipulator robot can be used and coupled in succession to different pumps in accordance with the program required for the manufacture. It is also possible to arrange several manipulator robots around a blank for the simultaneous feeding of different rubber products. A group of volumetric pumps of this type with one or more manipulator robots can constitute the volumetric extruders of a machine for the application of the rubber products, such as the one shown in Patent Application EP 0 264 600. It is also possible to prepare semifinished products, such as treads, or other products, such as flaps.

We claim:

1. A volumetric pump comprising at least one delivery piston (1) sliding in a fixed cylinder (11) with a reciprocating movement between a top dead center (PMH) and a bottom dead center (PMB), an inlet port (12) to the cylinder (11), said port being located between said top dead center (PMH) and bottom said dead center (PMB), a wall (13) shutting off the cylinder (11) on the side of the top dead center (PMH), an evacuation opening (14) from the cylinder provided with a non-return device, mechanical displacement means for positive transfer of the material into said cylinder through the inlet port (12), means for imparting reciprocating movement to the piston and for operating the mechanical displacement means to ensure that the volume extruded in one cycle of the pump is a direct function of the volume swept over by each delivery piston between the point where it closes the inlet portion and the top dead center (PMH), the closing of the inlet port by the piston isolating the cylinder from the material supplied by the mechanical displacement means, an outlet orifice (17) from the pump and an enclosure (4) of variable volume downstream of the non-return device and upstream of the outlet orifice.

2. A pump according to claim 1, characterized by the fact that is comprises a compensation piston (41) having a head (410) which constitutes a part of the wall of the enclosure (4) and by the fact that the variable portion of the volume of the enclosure (4) is the volume contained between the head (410) of the compensation piston (41) at any point of the cycle and the head (410) of the compensation piston (41) at its top dead center (PMH).

3. A pump according to claim 2, characterized by the fact that the movement of the compensation piston (41) is controlled by a cam (42) in synchronous rotation with the movement of the delivery piston (10).

4. A volumetric pump comprising at least one delivery piston (10) sliding in a cylinder (11) with a reciprocating movement between a top dead center (PMH) and a bottom dead center (PMB), an inlet port (12) to the cylinder, said inlet port being located axially between said top dead center and bottom dead center, a wall (13) shutting off the cylinder on the side of the top dead center, an evacuation opening (14) from the cylinder provided with a non-return device, a chamber (20) in communication with the inlet port, an admission opening to the chamber, a feed screw (21) rotating within the chamber and extending between the admission opening and the inlet port and means for imparting reciprocating motion to the piston and for rotating the screw to insure that the volume extruded in one cycle of the pump is a direct function of the volume swept over by each delivery piston between the point where it closes the inlet port and the top dead center.

5. A pump according to claim 4, characterized by the fact that the said chamber (20) is arranged at least partially around the cylinder (11) at the level of the port (12), the axis of rotation of the screw (21) being identical with the axis of the said cylinder (10).

6. A volumetric pump according to claim 4, characterized by the fact that it comprises at least two delivery pistons (10), each sliding in a cylinder (11), the said feed screw (21) being capable of feeding all said cylinders (11), an evacuation opening (14) for each cylinder provided with a non-return device, a collector connecting the evacuation openings with an outlet orifice (17), and further characterized by the fact that the movement of all the delivery pistons (10) is coordinated so as to make the discharge passing through the outlet orifice (17) constant.

7. A pump according to any one of claims 1 or 6, characterized by the fact that the non-return device is a ball (15) cooperating with a seat (151) produced on the evacuation opening (14) on the outer side of the cylinder (11).

8. A pump according to claim 7, characterized by the fact that the movement of said ball (15) is controlled synchronously with respect to the movement of the delivery piston or pistons (11).

9. A pump according to claim 6, characterized by the fact that the movement of all the pistons is controlled by a cam.

10. A pump according to claim 6, characterized by the fact that the movement of all the pistons is controlled by a single double-acting cylindrical cam (50), the axis of rotation of which is parallel to the axis of the said pistons.

11. A pump according to claim 10, characterized by the fact that the movement of each delivery piston (10) from the bottom dead center (PMB) to the top dead center (PMH) is controlled by a primary roller (51) in engagement with a first travel path (52) of the cam (50), the said primary roller (51) being held on each side by two side walls (520) and being arranged in the axis of the said piston (10), and by the fact that the return movement from the top dead center (PMH) to the bottom dead center (PMB) is controlled by a secondary roller (53) in engagement on a second travel path (54) of the cam (50), the said secondary roller (53) being mounted overhung with respect to each piston (10).

12. A volumetric pump comprising an admission trap for the material, an outlet orifice, a single input shaft, at least one delivery piston sliding in a fixed cylinder and driven by the input shaft with a reciprocating movement between a top dead center and a bottom dead center, a wall of the cylinder having an opening for the admission of the material from the admission trap which opening is closed to isolate the admission trap from the cylinder during the delivery, an evacuation opening provided with a non-return device, mechanical displacement means within the admission trap and driven by the input shaft for positive transfer of the material into said cylinder through the admission opening, the volume extruded by the pump in one cycle being a direct function of the volume swept by each delivery piston between the position in its stroke when the admission opening is closed and the top dead center of its stroke, and a cam system actuated by the input shaft for controlling the movements of each piston in such a manner that the discharge of material passing through the outlet orifice is constant for a constant speed of the input shaft.

13. A method of volumetric pumping by means of at least two delivery pistons, each sliding in a cylinder between a top dead center and a bottom dead center, the wall of at least one cylinder having an admission port located axially between said top dead center and bottom dead center, the wall which closes said cylinder on the side of the top dead center having an evacuation opening provided with a non-return device, the pumping cycle comprising the steps of feeding at least one cylinder with the material to be pumped when the piston releases the admission port, advancing the piston until the closing of the admission port, opening the non-return device to free the evacuation opening as soon as the piston has completely closed the admission port, continuing the advance of the piston up to the top dead center, then again closing the evacuation opening by the non-return device, returning the piston to the bottom dead center and again repeating said cycle and controlling the movements of the pistons so that the sum of the discharges from the volumetric pump is constant.

14. A method of manufacturing tires in which the unvulcanized rubber is placed on the blank by a pumping method according to claim 13.

15. A volumetric pump comprising at least one delivery piston (10) sliding in a cylinder (11) with a reciprocating movement between a top dead center (PMH) and a bottom dead center (PMB), an inlet port (12) to the cylinder, said inlet port being located axially between said top dead center and bottom dead center, a wall (13) shutting off the cylinder on the side of the top dead center, an evacuation opening (14) from the cylinder provided with a non-return device, a chamber (20) in communication with the inlet port, an admission opening to the chamber, mechanical displacement means within the chamber and extending between the admission opening and the inlet port and means for imparting reciprocating motion to the piston and for actuating the mechanical displacement means to insure that the volume extruded in one cycle of the pump is a direct function of the volume swept over by each delivery piston between the point where it closes the inlet port and the top dead center.

16. A volumetric pump comprising an admission trap for receiving the material to be extruded, an outlet orifice from the pump, a single input shaft, at least two delivery pistons sliding in fixed cylinders and driven by the input shaft with a reciprocating movement between a top dead center and a bottom dead center, openings in the cylinder walls communicating with the admission trap which openings are closed to isolate the admission trap from the cylinders during the delivery, an evacuation opening from each cylinder which opening communicates with the outlet orifice from the pump, a non-return device in each of said evacuation openings, mechanical displacement means within the admission trap and driven by the input shaft for positive transfer of the material from the admission trap into said cylinders through the admission openings, the volume extruded by the pump in one cycle being a direct function of the volumes swept by the pistons from the position that each piston closes the admission opening and the top dead center of the stroke, and a cam system actuated by the input shaft for controlling the movements of the pistons in such a manner that the discharge of material passing through the outlet orifice is constant for a constant speed of the input shaft.

* * * * *

UNITED STATES PATENT AND TRADEMARK OFFICE
CERTIFICATE OF CORRECTION

PATENT NO. : 5,261,795

DATED : November 16, 1993

INVENTOR(S) : Laurent et al.

It is certified that error appears in the above-identified patent and that said Letters Patent is hereby corrected as shown below:

Title page, first line of Item 63, "Jun. 30, 1982" should read --Jun. 30, 1992--;

Title page, 2nd column, last line, "7/1978" should read --9/1978--;

Column 6, line 48, "2x" should read --2$\pi$--;

Column 7, line 3, delete "permit, downstr";

Column 8, line 16, "pump" should read --pump for extruding rubber material--;

Column 8, line 17, "piston (1)" should read --piston (10)--;

Column 8, line 19, "(PMB)," should read --(PMB), an admission trap for accommodating the rubber material to be introduced into the cylinder,--;

Column 8, line 20, "cylinder (11)," should read --cylinder (11) from the admission trap,--;

Column 8, line 25, "means" should read --means within the admission trap--;

Column 8, line 26, "material" should read --rubber material--;

Column 8, line 30, "extruded" should read --extruded from the cylinder--;

Column 8, line 31, "each" should read --a--;

Column 8, line 40, "that is" should read --that it--;

UNITED STATES PATENT AND TRADEMARK OFFICE
CERTIFICATE OF CORRECTION

PATENT NO. : 5,261,795

DATED : November 16, 1993

INVENTOR(S) : Laurent et al.

It is certified that error appears in the above-identified patent and that said Letters Patent is hereby corrected as shown below:

Column 9, line 17, "any one of claims 1 or 6" should read --claim 6--;

Column 9, line 47, "pump" should read --pump for extruding rubber material during each cycle--;

Column 9, line 48, "the material" should read --receiving the rubber material--;

Column 9, line 48, "orifice," should read --orifice from the pump,--;

Column 9, lines 48-49, "at least one delivery piston sliding in a fixed cylinder" should read --two delivery pistons sliding in fixed cylinders--;

Column 9, line 52, "the cylinder" should read --at least one cylinder--;

Column 9, line 53, "material" should read --rubber material--;

Column 9, lines 55-56, "opening provided with" should read --opening from the cylinder which receives rubber material from the admission trap,--;

Column 9, line 56, "device," should read --device in said evacuation opening,--;

Column 9, line 58, "material" should read --rubber material--;

Column 9, lines 61-62, delete "by each delivery piston";

UNITED STATES PATENT AND TRADEMARK OFFICE
CERTIFICATE OF CORRECTION

PATENT NO. : 5,261,795

DATED : November 16, 1993

INVENTOR(S) : Laurent et al.

It is certified that error appears in the above-identified patent and that said Letters Patent is hereby corrected as shown below:

Column 9, line 62, "its stroke" should read --the stroke of the piston--;

Column 9, line 63, "of its" should read --of the--;

Column 10, line 37, "port" should read --port to the cylinder--.

Signed and Sealed this

Twenty-third Day of August, 1994

Attest:

BRUCE LEHMAN

Attesting Officer

Commissioner of Patents and Trademarks